(12) United States Patent
Ichinose et al.

(10) Patent No.: US 7,178,653 B2
(45) Date of Patent: Feb. 20, 2007

(54) ELECTROMAGNETIC CLUTCH

(75) Inventors: Hirokazu Ichinose, Isesaki (JP); Isamu Shirai, Isesaki (JP); Shigeru Ito, Isesaki (JP)

(73) Assignee: Sanden Corporation, Isesaki (JP)

( * ) Notice: Subject to any disclaimer, the term of this patent is extended or adjusted under 35 U.S.C. 154(b) by 171 days.

(21) Appl. No.: 10/994,289

(22) Filed: Nov. 23, 2004

(65) Prior Publication Data

US 2005/0133333 A1    Jun. 23, 2005

(30) Foreign Application Priority Data

Dec. 18, 2003  (JP) ............... 2003-420996

(51) Int. Cl.
*F16D 27/112* (2006.01)
(52) U.S. Cl. .............. 192/84.94; 192/84.961
(58) Field of Classification Search ............ None
See application file for complete search history.

(56) References Cited

U.S. PATENT DOCUMENTS

| | | | |
|---|---|---|---|
| 2,796,962 A | 6/1957 | Pierce | |
| 3,205,989 A | 9/1965 | Mantey | |
| 4,187,939 A | 2/1980 | Silvestrini et al. | |
| 4,227,600 A | 10/1980 | Shirai | |
| 4,860,867 A * | 8/1989 | Nishimura | 192/84.941 |
| 5,080,213 A * | 1/1992 | Sunaga | 192/84.94 |
| 5,560,464 A | 10/1996 | Gonda et al. | |
| 2002/0070089 A1 | 6/2002 | Dorfler | |

FOREIGN PATENT DOCUMENTS

| | | |
|---|---|---|
| DE | 1944137 A | 8/1966 |
| DE | 2656311 A1 | 6/1978 |
| EP | 0422528 A1 | 4/1991 |
| FR | 2813931 A1 | 3/2002 |
| JP | 1989172640 A | 7/1989 |
| JP | H7035830 | 7/1995 |

OTHER PUBLICATIONS

French Search Report (French Patent Appl'n No. 0413064-00)dtd Apr. 19, 2006.

* cited by examiner

*Primary Examiner*—Saul Rodriguez

(57) ABSTRACT

In an electromagnetic clutch, an electromagnetic coil is energized to couple a rotor and an armature plate to each other. Each leaf spring extends in a direction so as to intersect at an obtuse angle with the rotating direction of the armature plate, and accordingly, when the power of the driving source is transmitted to the armature plate through the rotor, a compressive force acts upon the leaf spring. The leaf spring has an inclined portion, and the armature plate is pressed against the rotor by the compressive force. Each leaf spring has a first extended portion located between the first coupling portion and inclined portion thereof and a second extended portion located between the second coupling portion and inclined portion thereof.

14 Claims, 5 Drawing Sheets

ELECTROMAGNETIC CLUTCH

CROSS-REFERENCE TO RELATED APPLICATIONS

This nonprovisional application claims priority under 35 U.S.C. § 119(a) on Patent Application No. 2003-420996 filed in Japan on Dec. 18, 2003, the entire contents of which are incorporated herein by reference.

BACKGROUND OF THE INVENTION

1. Field of the Invention

The present invention relates to an electromagnetic clutch for intermittently transmitting the rotating force of an external driving source, such as an engine, to a driven device, such as a compressor.

2. Description of the Related Art

An electromagnetic clutch of this type is disclosed in Unexamined Japanese Utility Model Publication No. H07-35830.

The electromagnetic clutch disclosed in this publication is applied to a refrigerant compressor. The disclosed clutch comprises a rotor rotated by an external driving source and including an electromagnetic coil, an armature plate movable between a position where the armature plate is in contact with the rotor and a position where the armature plate is spaced from the rotor, a boss coupled to the main shaft of the compressor, and leaf springs coupling the armature plate and the boss to each other.

While the electromagnetic coil is de-energized, the armature plate remains spaced from the rotor due to the elasticity of the leaf springs, and thus the rotating force of the rotor is not transmitted to the armature plate. On the other hand, when the electromagnetic coil is energized, the armature plate is attracted to the rotor against the elastic force of the leaf springs, whereby the rotor and the armature plate are coupled to each other. Because of the coupling, the rotating force of the rotor is transmitted to the armature plate and then to the boss through the leaf springs, and the rotating force of the boss is transmitted to the main shaft of the compressor.

In the case where the external driving source is an automotive engine, intermittent operation of the electromagnetic clutch permits the motive power of the engine to be intermittently transmitted to the main shaft of the compressor, with the result that the compressor is intermittently operated.

In the conventional electromagnetic clutch, however, the force of coupling between the armature plate and the rotor is derived solely from the magnetomotive force of the electromagnetic coil. Thus, to increase the torque capacity of the compressor, the electromagnetic coil and the rotor should inevitably be increased in size, hindering reducing the weight of the electromagnetic clutch as well as the consumption of electric power. Also, since the self-inductance of the electromagnetic coil increases due to its increased size, the disengagement or decoupling response of the clutch is poor, and extremely large noise is produced when the armature plate is decoupled from the rotor. Further, increase in the magnetomotive force results in a shorter synchronization time allowed at the initial stage of coupling between the armature plate and the rotor, so that the rotating force of the rotor is transmitted, as an impact force, to the armature plate, adversely affecting the internal parts of the compressor.

To solve the problem, an electromagnetic clutch has been proposed in Japanese Patent Application No. 2003-201322.

Each leaf spring used in the proposed electromagnetic clutch has an inclined portion extending at a predetermined inclination angle from the boss toward the armature plate, and the extending direction of the leaf spring intersects at an obtuse angle with the rotating direction of the armature plate.

In this electromagnetic clutch, when the rotating force of the rotor is transmitted to the armature plate, the armature plate applies a compressive force to each leaf spring toward the boss, because the extending direction of the leaf spring intersects at an obtuse angle with the rotating direction of the armature plate. Also, since the leaf spring is inclined, part of the rotating force of the rotor acts as a force of pressing the armature plate against the rotor when the compressive force is produced. This pressing force adds to the force of coupling between the armature plate and the rotor. Consequently, the actual force of coupling between the armature plate and the rotor is given by the sum of the magnetomotive force produced by the electromagnetic coil and the pressing force, and thus the magnetomotive force of the electromagnetic coil can be cut down by an amount corresponding to the pressing force.

In the second-mentioned electromagnetic clutch, a compressive force acts upon the leaf springs. It is therefore necessary that the mechanical strength of the leaf springs should be correspondingly increased, and the thickness of the leaf springs is increased for the purpose.

Although the strength of the leaf springs can be increased by increasing the thickness thereof, the magnetomotive force required to attract the armature plate to the rotor also increases, giving rise to a problem that the magnetomotive force of the electromagnetic coil cannot be significantly cut down.

SUMMARY OF THE INVENTION

The present invention was created in view of the aforementioned problems with the conventional clutches, and an object thereof is to provide an electromagnetic clutch of which the magnetomotive force to be produced by an electromagnetic coil can be reduced, compared with the conventional clutches.

To achieve the object, the present invention provides an electromagnetic clutch for intermittently transmitting motive power from a driving source to a driven device. An electromagnetic clutch according to the present invention comprises: an electromagnetic coil for producing an electromagnetic force when energized; a rotor adapted to receive the motive power from the driving source; an armature plate movable between a position where the armature plate is in contact with the rotor and a position where the armature plate is spaced from the rotor, the armature plate being attracted toward the rotor by the electromagnetic force produced by the electromagnetic coil; a boss coupled to a main shaft of the driven device; and a leaf spring having one end serving as a first coupling portion coupled to the armature plate and the other end serving as a second coupling portion coupled to the boss, the leaf spring having an elastic force set such that when the electromagnetic coil is de-energized, the leaf spring keeps the armature plate spaced from the rotor, and that when the electromagnetic coil is energized, the leaf spring allows the armature plate to come into contact with the rotor against the elastic force thereof, wherein said leaf spring comprises an inclined portion extending at a predetermined inclination angle from the boss toward the armature plate, and an extended portion parallel with the armature plate and located between the inclined portion and at least one of the first and second coupling portions; and the extending direction of said leaf spring intersects at an obtuse angle with a rotating direction of the armature plate.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE PREFERRED EMBODIMENTS

Figure 1:
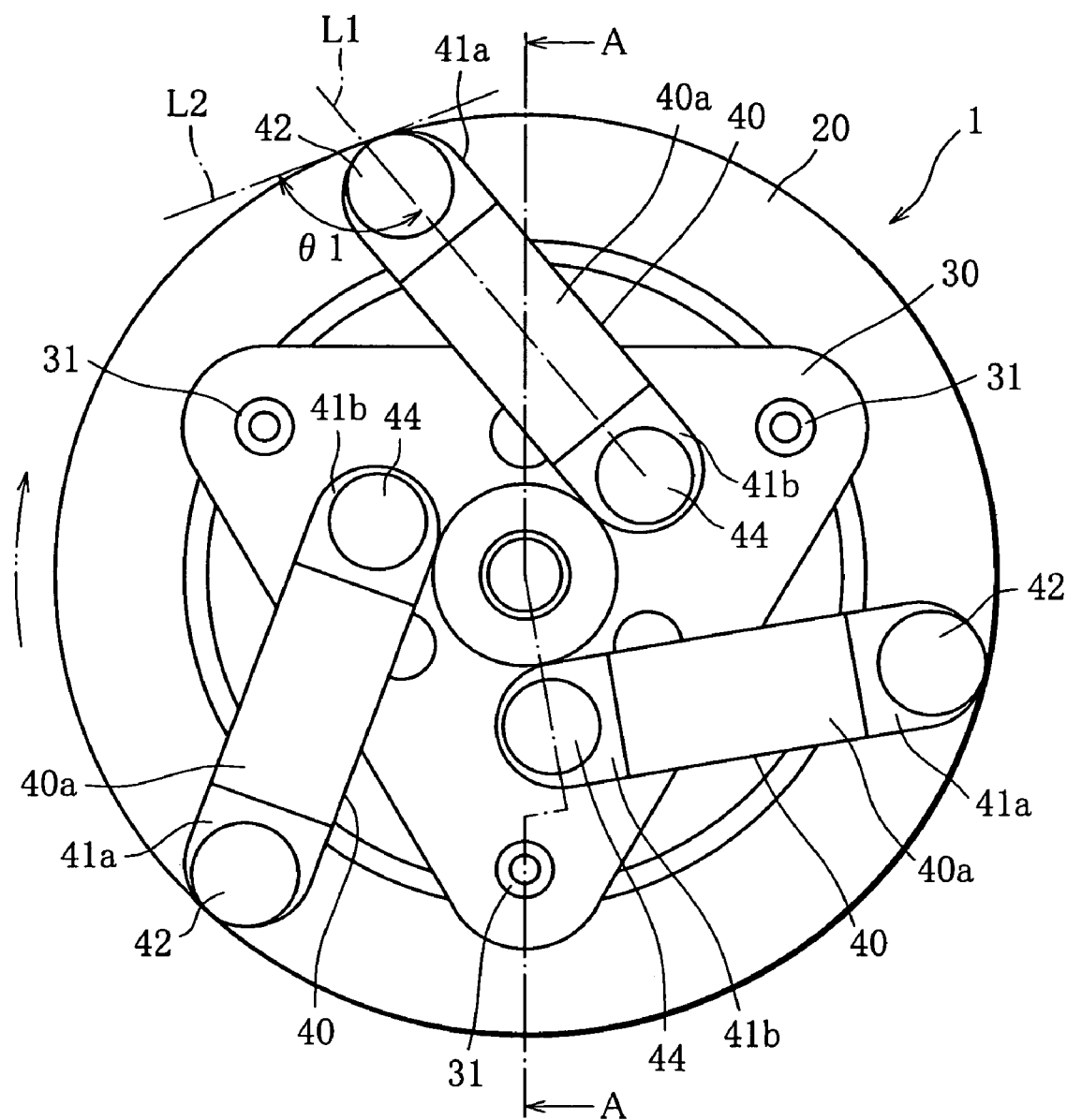
FIG. 1 is a front view of an electromagnetic clutch.
Figure 2:
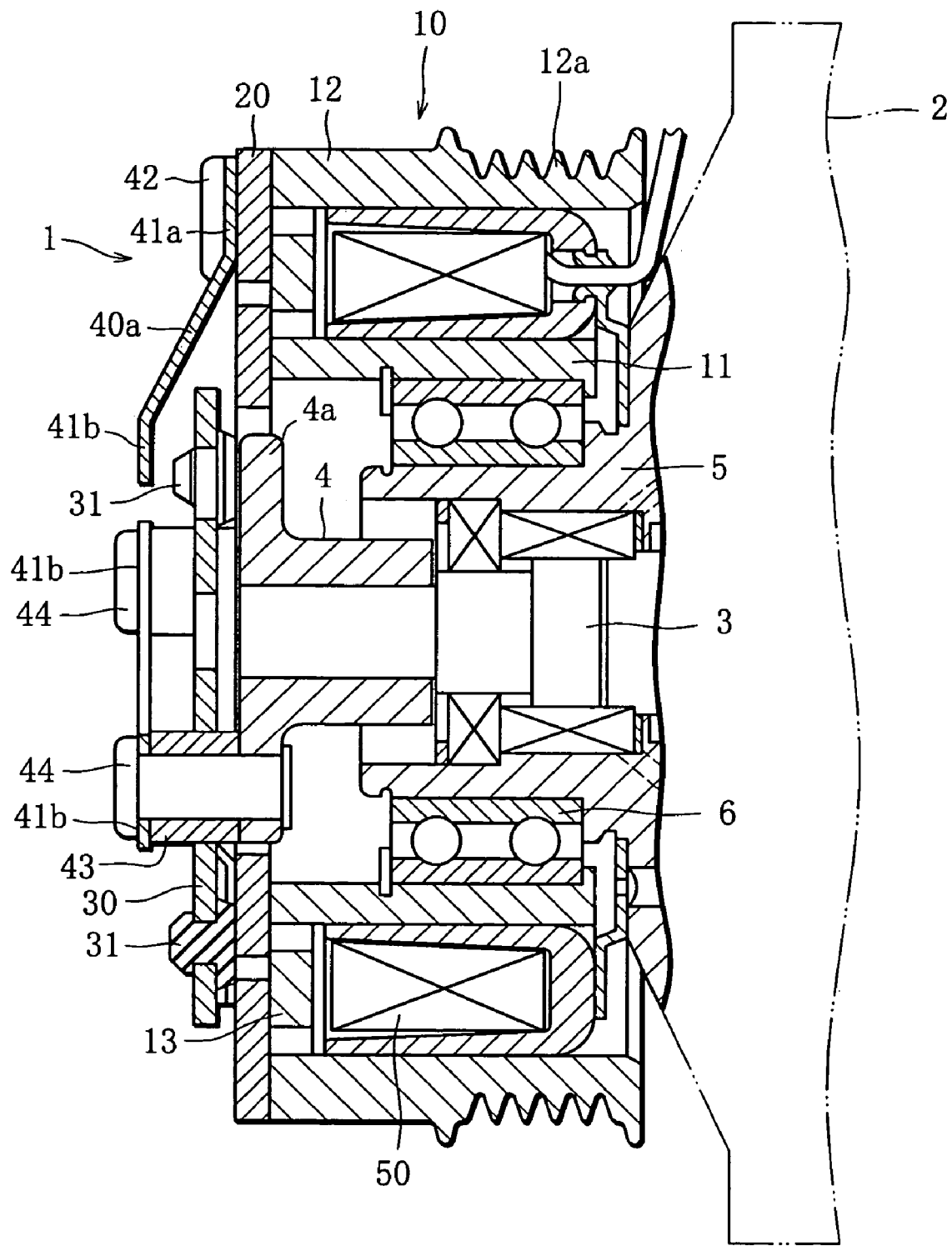
FIG. 2 is a sectional view taken along line A—A in FIG. 1.

An electromagnetic clutch 1 according to a first embodiment of the present invention, which is applied to a compressor 2 as a driven device, will be hereinafter described with reference to FIGS. 1 to 6.

The electromagnetic clutch 1 has the function of intermittently transmitting rotating force to a rotary shaft 3 of the compressor 2. The rotary shaft 3 has a distal end screwed into a boss 4 having an annular flange 4a so that the rotating force can be transmitted from the electromagnetic clutch 1 to the rotary shaft 3 through the flange 4a, as described later.

The electromagnetic clutch 1 comprises a cylindrical rotor 10, an armature plate 20, a coupling plate 30, and leaf springs 40.

The rotor 10 includes an inner ring 11, an outer ring 12, and a front plate 13 coupling the front ends of the inner and outer rings 11 and 12 to each other. An electromagnetic coil 50 is fitted in a space between the inner and outer rings 11 and 12. While the electromagnetic coil 50 is energized, the rotor 10 as a whole acts as an electromagnet and attracts the armature plate 20.

The rotor 10 has a belt fitting groove 12a formed in the outer ring 12, and a belt is passed around the groove 12a so that rotating force may be transmitted to the rotor 10 from an external driving source, for example, an automotive engine, not shown. A front housing 5 of the compressor 2 projects into the inner ring 11, and a ball bearing 6 is interposed between the front housing 5 and the inner ring 11. The rotor 10 is constructed in the manner described above, whereby the rotating force of the engine is transmitted to the rotor 10, causing the rotor 10 to rotate around the front housing 5.

The armature plate 20 is made of a magnetic material, for example, a ferrous material. The armature plate 20 is annular in shape and arranged so as to face the front plate 13 of the rotor 10 with a space therebetween.

The coupling plate 30 is arranged in front of the armature plate 20 with a space therebetween and is made of a metal plate generally in the form of an equilateral triangle, as shown in FIG. 1. Three rubber vibration insulators 31 are fixed to the coupling plate 30 at locations near the respective corners. The rubber vibration insulators 31 penetrate through the coupling plate 30 and are disposed in contact with the front surface of the armature plate 20 so as to damp vibration of the coupling plate 30.

The leaf springs 40, which are three in number, are made of a ferrous metal. Each leaf spring 40 has a first coupling portion 41a at one end thereof, and the first coupling portion 41a is fixed to an outer peripheral portion of the armature plate 20 by a rivet 42. Also, each leaf spring 40 has a second coupling portion 41b at the other end thereof, and the second coupling portion 41b is coupled to the flange 4a of the boss 4 by a rivet 44 with a spacer 43 interposed between the second coupling portion 41b and the flange 4a. The leaf springs 40 serve to keep the armature plate 20 spaced from the front plate 13 of the rotor 10.

Also, each leaf spring 40 extends from the second coupling portion 41b to the first coupling portion 41a, as shown in FIG. 1, and the extending direction of the leaf spring 40 intersects at an obtuse angle with the rotating direction (indicated by the dot-dot-dash arrow in FIG. 1) of the armature plate 20. Specifically, as shown in FIG. 1, an obtuse angle θ1 is formed between the extending direction (dot-dot-dash line L1) of the leaf spring 40 and a tangential line (dot-dot-dash line L2) tangent to the outer periphery of the armature plate 20 at a point where the extending direction intersects with the outer periphery of the armature plate 20. Also, as seen from FIG. 2, the first and second coupling portions 41a and 41b of each leaf spring 40 are parallel with the armature plate 20 and the coupling plate 30, but an intermediate portion between the first and second coupling portions 41a and 41b is obliquely inclined, thus forming an inclined portion 40a.

In this embodiment, while the electromagnetic coil 50 is de-energized, the rotor 10 and the armature plate 20 are kept separated from each other due to the elasticity of the leaf springs 40, and thus the rotating force of the rotor 10 is not transmitted to the armature plate 20.

On the other hand, when the electromagnetic coil 50 is energized, the rotor 10 acts as an electromagnet. Consequently, magnetomotive force is produced in the rotor 10 and the armature plate 20 is attracted to the front plate 13 of the rotor 10 against the elastic force of the leaf springs 40, so that the rotor 10 and the armature plate 20 are coupled to each other. Because of the coupling, the rotating force of the rotor 10 is transmitted to the armature plate 20 and then successively to the leaf springs 40, the spacers 43, the boss 4 and the rotary shaft 3, causing the rotary shaft 3 to rotate. The rotating force of the rotary shaft 3 allows the compressor 2 to perform suction and compression of refrigerant.

In the electromagnetic clutch 1 of this embodiment, since the rotating direction of the armature plate 20 and the extending direction of each leaf spring 40 intersect at the obtuse angle θ1, the rotating force of the armature plate 20 acts upon the leaf spring 40 as a compressive force. Also, since each leaf spring 40 is inclined, part of the rotating force of the rotor 10 acts as a force of pressing the armature plate 20 against the rotor 10 when the compressive force is produced. This pressing force adds to the force of coupling the armature plate 20 and the rotor 10, making it possible to cut down the magnetomotive force of the electromagnetic coil 50.

Figure 3:
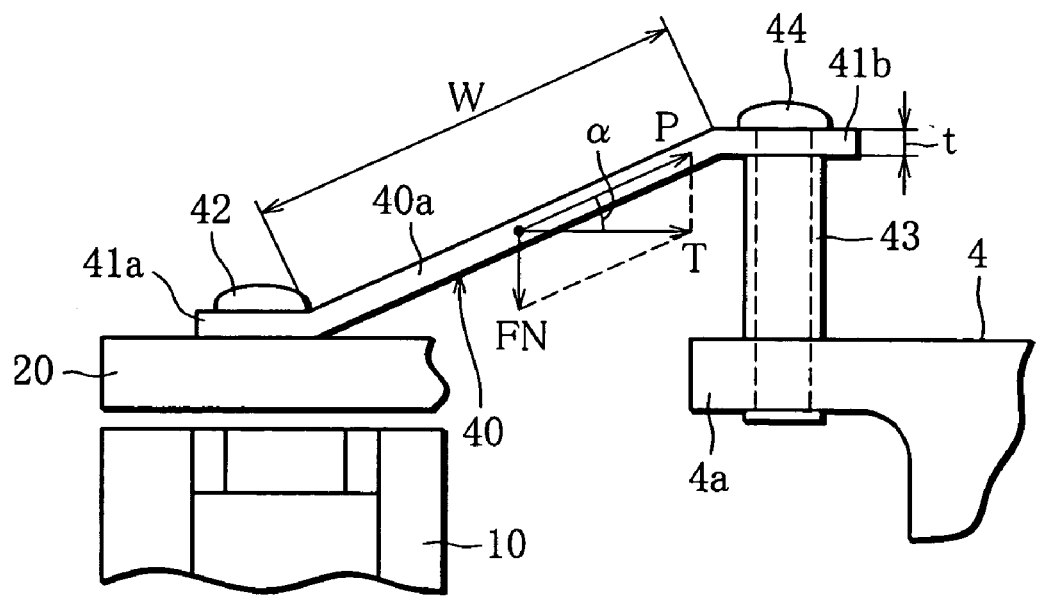
FIG. 3 is a side view of a conventional leaf spring, illustrating the principle of generation of spring pressing force.

The effect will be explained in more detail with reference to FIG. 3. When the armature plate 20 is rotated while being attracted to the rotor 10, a force T parallel to the outer surface of the armature plate 20 acts upon the leaf spring 40 due to the frictional force between the armature plate 20 and the rotor 10. Since the inclined portion 40a of the leaf spring 40 is inclined at an angle α with respect to the armature plate 20, the force T is decomposed into the compressive force P acting in the extending direction of the leaf spring 40 and the pressing force FN acting in such a direction as to press the armature plate 20 against the rotor 10. Provided the leaf spring 40 itself exerts an elastic force FS on the armature plate 20 in a direction so as to separate the armature plate 20 from the rotor 10, the pressing force FN acts on the armature plate 20 in a direction so as to press the armature plate 20 toward the rotor 10 against the elastic force FS.

To minimize current supplied to the electromagnetic coil 50, the pressing force FN may be increased (the inclination angle α of the leaf spring 40 may be increased). However, in the case where the pressing force FN is greater than the elastic force FS, the rotor 10 and the armature 20 fail to be separated or decoupled if the force T keeps acting upon the armature plate 20 due to the frictional resistance of the armature plate 20 and the rotor 10 even after the electromagnetic coil 50 ceases to be energized. Accordingly, a maximum inclination angle a that permits the members 10 and 20 to be decoupled was calculated. Provided the coefficient of friction is μ, the following relationships hold:

$$\mu \cdot (FN-FS) < T \quad (1)$$

$$FN = T \cdot \tan \alpha \quad (2)$$

From equation (2), $$T = FN/\tan \alpha \quad (3)$$

and therefore, from expressions (1) and (3), $$\tan \alpha < (1/\mu) \cdot FN/(FN-FS) \quad (4)$$

Let it be assumed that μ is equal to 0.5 (normal coefficient of friction). FS is greater than 0 (zero) and 0 (zero) is substituted for FS assuming the case where α is at a maximum in expression (4), then α<63°.

It was thus found out that the inclination angle α of the leaf springs 40 should be set to a value smaller than 63°.

The construction of the electromagnetic clutch described above is similar to that of the conventional electromagnetic clutch disclosed in the aforementioned patent publication. However, in the conventional electromagnetic clutch, the compressive force P acting upon the leaf spring 40 due to the force T is large, incurring the possibility of the leaf spring 40 being buckled, and therefore, the thickness t of the leaf spring 40 is increased.

If the leaf spring 40 is increased in thickness, however, the rigidity of the leaf spring 40 increases, as mentioned above, making it necessary to set the magnetomotive force of the electromagnetic coil 50 to a larger value.

According to this embodiment, each leaf spring 40' has a reduced thickness and an increased length. Namely, the thickness t1 of the leaf spring 40' is smaller than the thickness t of the conventional leaf spring 40. As for the length of the leaf spring 40', the inclined portion 40a has a length W equal to that of the leaf spring used in the conventional electromagnetic clutch; however, the leaf spring 40' has a first extended portion 45a with a length W1 located between the first coupling portion 41a and the inclined portion 40a as well as a second extended portion 45b with a length W2 located between the second coupling portion 41b and the inclined portion 40a. Consequently, the leaf spring 40' of the embodiment is longer than the leaf spring used in the conventional electromagnetic clutch. The extended portions 45a and 45b are parallel with the armature plate 20.

Figure 4:
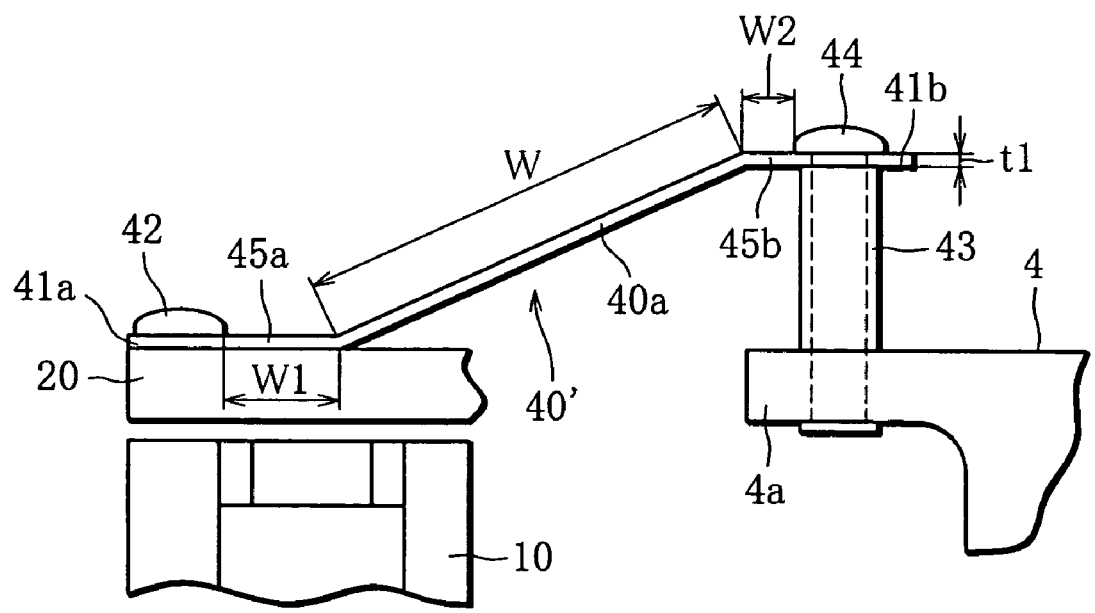
FIG. 4 is a side view showing a decoupled state of an armature plate and a rotor according to a first embodiment.
Figure 5:
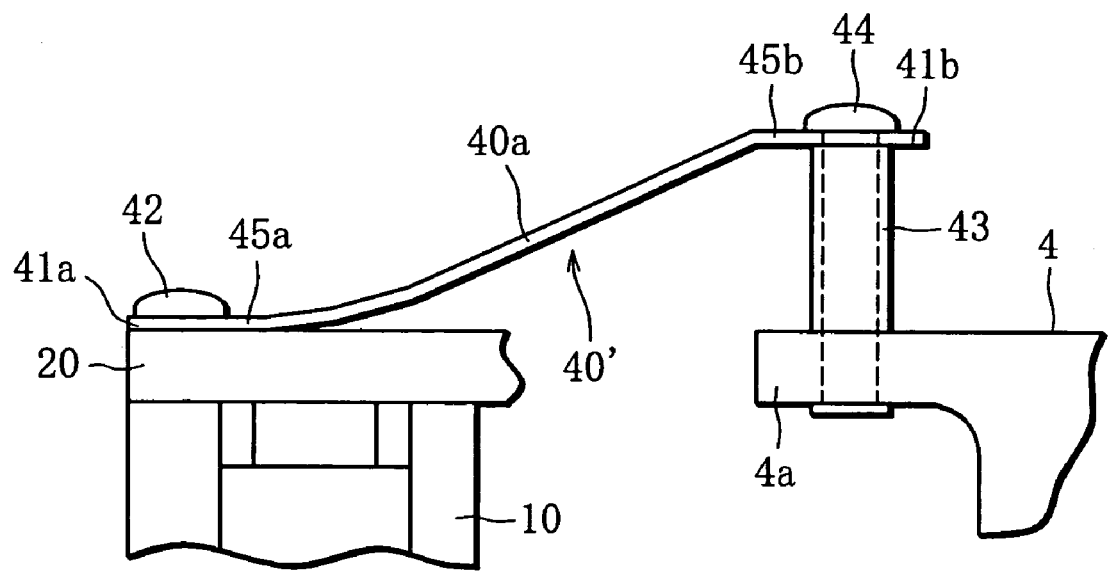
FIG. 5 is a side view showing a coupled state of the armature plate and the rotor according to the first embodiment.
Figure 6:
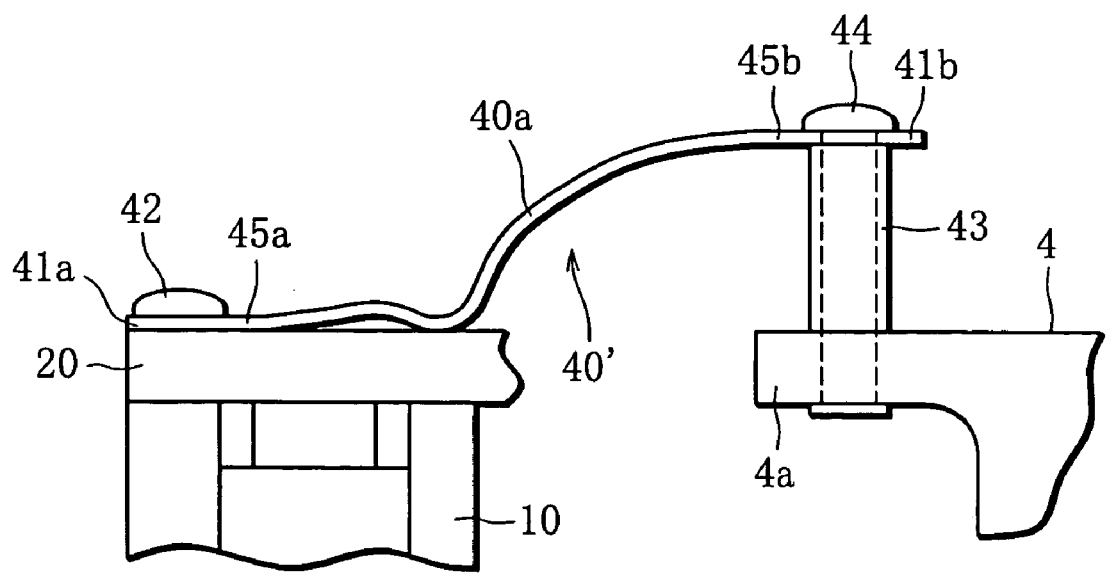
FIG. 6 is a side view showing a state in which the armature plate is rotated while being coupled to the rotor, according to the first embodiment.

Referring now to FIGS. 4 to 6, how the leaf springs 40' are deformed when the rotor 10 and the armature plate 20 are coupled to each other and when the armature plate 20 is rotated while being coupled to the rotor 10 will be explained. When the rotor 10 and the armature plate 20 are in a disengaged or decoupled state, the armature plate 20 remains spaced from the rotor 10 due to the elasticity of the leaf springs 40', as shown in FIG. 4. When the electromagnetic coil 50 is energized, the rotor 10 is magnetized and the armature plate 20 is attracted to the rotor 10, as shown in FIG. 5. At this time, each leaf spring 40' is elastically deformed especially at the portion of each spring 40' near the first extended portion 45a. Since the armature plate 20 is attracted to the rotor 10, the rotating force of the rotor 10 is transmitted to the armature plate 20 and then to the leaf springs 40'. In this case, the aforementioned compressive force P acts upon each leaf spring 40'; therefore, a portion of the leaf spring 40' near the second coupling portion 41b is elastically deformed, as shown in FIG. 6, and the rotating force is transmitted from the armature plate 20 to the boss 4 through the leaf springs 40' thus elastically deformed.

According to this embodiment, the leaf spring 40' is longer than the conventional leaf spring 40 by (W1+W2), as mentioned above. Thus, the compressive force P applied per unit area can be reduced by an amount corresponding to the increase in length of the leaf spring 40', and it is therefore unnecessary to increase the thickness of the leaf spring 40'. This makes it possible to reduce the exciting voltage applied to the electromagnetic coil 50, thus saving energy.

Figure 7:
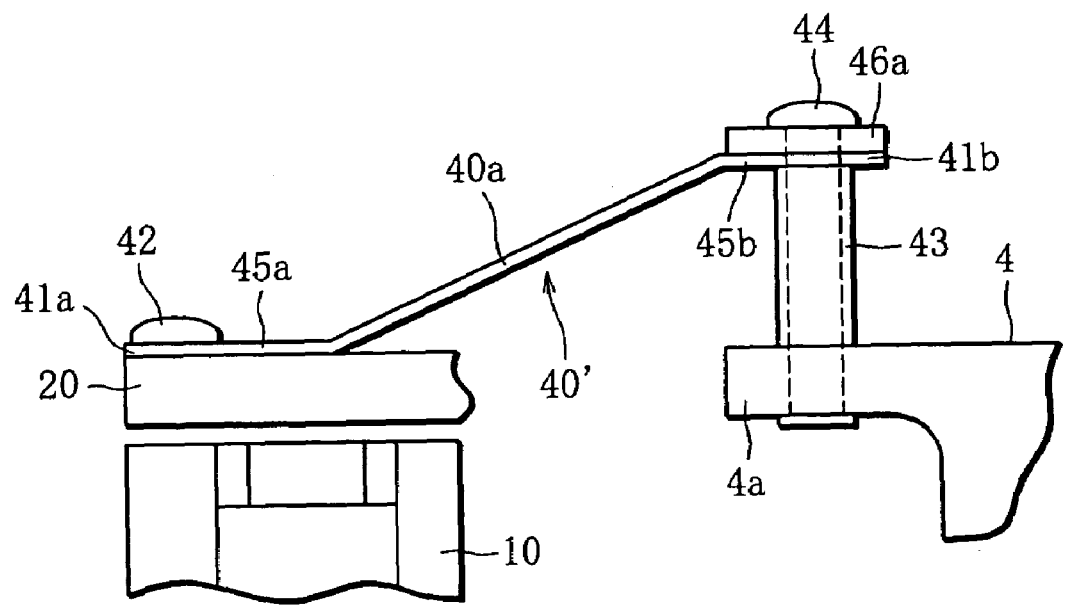
FIG. 7 is a side view showing a decoupled state of the armature plate and the rotor according to a second embodiment.

FIG. 7 shows an electromagnetic clutch according to a second embodiment of the present invention. This embodiment differs from the first embodiment in that a first reinforcing plate 46a is additionally provided. Specifically, the first reinforcing plate 46a is placed on the outer surface of the second coupling portion 41b of the leaf spring 40' and the second coupling portion 41b is securely held between the first reinforcing plate 46a and the spacer 43. Also, the first reinforcing plate 46a extends toward the inclined portion 40a so as to cover the outer surface of the second extended portion 45b.

According to this embodiment, when the armature plate 20 is rotated and the portion of the leaf spring 40' near the second coupling portion 41b is elastically bent outward due to the compressive force P then acting thereon, the first reinforcing plate 46a bears the bent portion and restrains the elastic deformation of the leaf spring 40'. The force borne by the first reinforcing plate 46a to restrain the deformation of the leaf spring 40' adds to the force FN of pressing the armature plate 20 against the rotor 10, thus making it possible to further reduce the exciting voltage applied to the electromagnetic coil 50.

The construction of the other elements and the operation are identical with those explained above with reference to the first embodiment, and therefore, description thereof is omitted.

Figure 8:
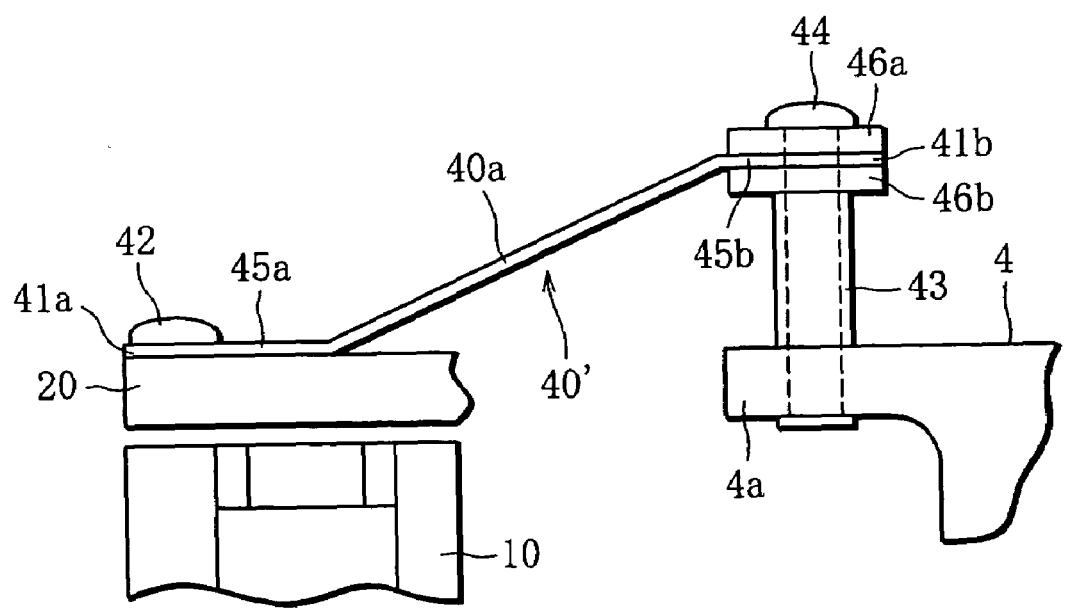
FIG. 8 is a side view showing a decoupled state of the armature plate and the rotor according to a third embodiment.

FIG. 8 shows an electromagnetic clutch according to a third embodiment of the present invention. Compared with the second embodiment, the third embodiment is provided further with a second reinforcing plate 46b, in addition to the first reinforcing plate 46a.

Specifically, the second reinforcing plate 46b is disposed on the inner surface of the second coupling portion 41b of the leaf spring 40' and the second coupling portion 41b is securely held between the first and second reinforcing plates 46a and 46b. Also, the second reinforcing plate 46b extends toward the inclined portion 40a so as to cover the inner surface of the second extended portion 45b.

According to this embodiment, when the armature plate 20 is rotated and the portion of the leaf spring 40' near the second coupling portion 41b is elastically bent outward or inward due to the compressive force P then acting thereon, the reinforcing plates 46a and 46b bear the bent portion and restrain the elastic deformation of the leaf spring 40'. The force borne by the reinforcing plate to restrain the deformation of the leaf spring 40' adds to the force FN of pressing the armature plate 20 against the rotor 10, thus making it possible to further reduce the exciting voltage applied to the electromagnetic coil 50. The construction of the other elements and the operation are identical with those explained above with reference to the first embodiment, and therefore, description thereof is omitted.

In the first embodiment, each leaf spring 40' has both the first and second extended portions 45a and 45b but may be provided with either one of the extended portions. Also, where the leaf springs 40' are made of a material with high elasticity, increased elasticity permits the leaf springs 40' to be elastically deformed with a smaller attractive force, making it possible to lower the voltage applied to the electromagnetic coil 50 to attract the armature plate 20. Further, in the foregoing embodiments, the present invention is applied to the electromagnetic clutch of a rotary coil type in which the electromagnetic coil 50 rotates together with the rotor 10. The application of the present invention is, however, not limited to this type of electromagnetic clutch, and the invention can of course be applied to a stationary coil type, not shown, in which the electromagnetic coil is not rotated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electromagnetic clutch for intermittently transmitting motive power from a driving source to a driven device, comprising:
   an electromagnetic coil for producing an electromagnetic force when energized;
   a rotor adapted to receive the motive power from the driving source;
   an armature plate movable between a position where the armature plate is in contact with the rotor and a position where the armature plate is spaced from the rotor, the armature plate being attracted toward the rotor by the electromagnetic force produced by the electromagnetic coil;
   a boss coupled to a main shaft of the driven device; and
   a leaf spring having one end serving as a first coupling portion coupled to the armature plate and the other end serving as a second coupling portion coupled to the boss, the leaf spring having an elastic force set such that when the electromagnetic coil is de-energized, the leaf spring keeps the armature plate spaced from the rotor, and that when the electromagnetic coil is energized, the leaf spring allows the armature plate to come into contact with the rotor against the elastic force thereof; wherein:
   said leaf spring comprises an inclined portion extending at a predetermined inclination angle from the boss toward the armature plate, and an extended portion parallel with the armature plate and located between the inclined portion and at least one of the first and second coupling portions;
   wherein a straight line extending substantially along a centerline of said leaf spring and extending from the first coupling portion intersects at an obtuse angle with a rotating direction of the armature plate.

2. The electromagnetic clutch according to claim 1, wherein said extended portion of the leaf spring is a first extended portion located between the first coupling portion and the inclined portion.

3. The electromagnetic clutch according to claim 1, wherein said extended portion of the leaf spring is a second extended portion located between the second coupling portion and the inclined portion.

4. The electromagnetic clutch according to claim 1, wherein said extended portion of the leaf spring includes a first extended portion located between the first coupling portion and the inclined portion and a second extended portion located between the second coupling portion and the inclined portion.

5. The electromagnetic clutch according to claim 1, further comprising:
   a first reinforcing plate extending toward the inclined portion of the leaf spring and covering an outer surface of the leaf spring near the second coupling portion.

6. The electromagnetic clutch according to claim 4, further comprising:
   a first reinforcing plate extending toward the inclined portion of the leaf spring and covering an outer surface of the leaf spring near the second coupling portion; and
   a second reinforcing plate extending toward the inclined portion of the leaf spring and covering an inner surface of the leaf spring near the second coupling portion.

7. The electromagnetic clutch according to claim 1, wherein said leaf spring is made of a material with high elasticity.

8. The electromagnetic clutch according to claim 1, wherein the predetermined inclination angle from the boss toward the armature plate is less than 63 degrees.

9. An electromagnetic clutch for intermittently transmitting motive power from a driving source to a driven device, comprising:
   an electromagnetic coil for producing an electromagnetic force when energized;
   a rotor adapted to receive the motive power from the driving source;
   an armature plate movable between a position where the armature plate is in contact with the rotor and a position where the armature plate is spaced from the rotor, the armature plate being attracted toward the rotor by the electromagnetic force produced by the electromagnetic coil;
   a boss coupled to a main shaft of the driven device;
   a leaf spring having one end serving as a first coupling portion coupled to the armature plate and the other end serving as a second coupling portion coupled to the boss, the leaf spring having an elastic force set such that when the electromagnetic coil is de-energized, the leaf spring keeps the armature plate spaced from the rotor, and that when the electromagnetic coil is energized, the leaf spring allows the armature plate to come into contact with the rotor against the elastic force thereof; wherein said leaf spring comprises an inclined portion extending at a predetermined inclination angle from the boss toward the armature plate, and a first extended portion and a second extended portion, each parallel with the armature plate and located between the inclined portion and the first and second coupling portions, respectively; and a first reinforcing plate extending toward the inclined portion of the leaf spring and covering an outer surface of the leaf spring near the second coupling portion; and a second reinforcing plate extending toward, but not parallel to, the inclined portion of the leaf spring and covering an inner surface of the leaf spring near the second coupling portion; wherein a straight line extending substantially along a centerline of said leaf spring and extending from the first coupling portion intersects at an obtuse angle with a rotating direction of the armature plate; and wherein said extended portion of the leaf spring includes a first extended portion located between the first coupling portion and the inclined portion and a second extended portion located between the second coupling portion and the inclined portion.

10. The electromagnetic clutch according to claim 9, wherein said leaf spring is made of a material with high elasticity.

11. The electromagnetic clutch according to claim 9, wherein the predetermined inclination angle is less than 63 degrees.

12. An electromagnetic clutch for intermittently transmitting motive power from a driving source to a driven device, comprising:

an electromagnetic coil for producing an electromagnetic force when energized;

a rotor adapted to receive the motive power from the driving source;

an armature plate movable between a position where the armature plate is in contact with the rotor and a position where the armature plate is spaced from the rotor, the armature plate being attracted toward the rotor by the electromagnetic force produced by the electromagnetic coil;

a boss coupled to a main shaft of the driven device;

a leaf spring having one end serving as a first coupling portion coupled by a first rivet to the armature plate and the other end serving as a second coupling portion coupled by a second rivet to the boss, the leaf spring having an elastic force set such that when the electromagnetic coil is de-energized, the leaf spring keeps the armature plate spaced from the rotor, and that when the electromagnetic coil is energized, the leaf spring allows the armature plate to come into contact with the rotor against the elastic force thereof; wherein said leaf spring comprises an inclined portion extending at a predetermined inclination angle from the boss toward the armature plate, and a first extended portion and a second extended portion, each parallel with the armature plate and located between the inclined portion and the first and second coupling portions, respectively; and a first reinforcing plate extending toward the inclined portion of the leaf spring and covering an outer surface of the leaf spring near the second coupling portion; and a second reinforcing plate extending toward the inclined portion of the leaf spring and covering an inner surface of the leaf spring near the second coupling portion;

wherein a straight line extending substantially along a centerline of said leaf spring and extending from the first coupling portion intersects at an obtuse angle with a rotating direction of the armature plate.

13. The electromagnetic clutch according to claim 12, wherein said leaf spring is made of a material with high elasticity.

14. The electromagnetic clutch according to claim 12, wherein the predetermined inclination angle is less than 63 degrees.

* * * * *